United States Patent [19]

Rosebrugh et al.

[11] Patent Number: 5,630,168

[45] Date of Patent: May 13, 1997

[54] SYSTEM FOR UTILIZING OBJECT ORIENTED APPROACH IN A PORTABLE PEN-BASED DATA ACQUISITION SYSTEM BY PASSING DIGITIZED DATA BY DATA TYPE TO HIERARCHICALLY ARRANGED PROGRAM OBJECTS

[75] Inventors: Christopher Rosebrugh, Lake Oswego; Eng-Kee Kwang; Jin H. Kim, both of Beaverton, all of Oreg.

[73] Assignee: PI Systems Corporation, Portland, Oreg.

[21] Appl. No.: 966,996

[22] Filed: Oct. 27, 1992

[51] Int. Cl.$^6$ ............................. G06F 17/40; G06K 9/22
[52] U.S. Cl. ........................ 395/825; 235/472; 358/473; 382/313; 382/314
[58] Field of Search ......................... 395/275, 200, 395/821, 825; 382/313, 314; 235/472; 358/473

[56] References Cited

U.S. PATENT DOCUMENTS

| | | | |
|---|---|---|---|
| 4,360,831 | 11/1982 | Kellar | 358/182 |
| 4,751,741 | 6/1988 | Mochinaga et al. | 382/13 |
| 4,873,398 | 10/1989 | Hubby | 178/18 |
| 4,947,302 | 8/1990 | Callahan | 362/233 |
| 5,107,541 | 4/1992 | Hilton | 382/3 |
| 5,164,585 | 11/1992 | Lieu | 250/221 |
| 5,183,404 | 2/1993 | Aldous et al. | 439/55 |
| 5,294,792 | 3/1994 | Lewis et al. | 250/221 |
| 5,309,173 | 5/1994 | Izzi et al. | 345/190 |
| 5,325,526 | 6/1994 | Cameron et al. | 395/650 |
| 5,329,625 | 7/1994 | Kannan et al. | 395/275 |
| 5,333,069 | 7/1994 | Spence | 358/517 |
| 5,550,938 | 8/1996 | Hayakawa et al. | 382/313 |

OTHER PUBLICATIONS

"Handwriting Recognition in the GO Operating System", Carr, IEEE, 1991, pp. 483–486 1991.

Primary Examiner—Thomas C. Lee
Assistant Examiner—Rehana P. Krick
Attorney, Agent, or Firm—Titus & McConomy

[57] ABSTRACT

An object oriented database data acquisition device having a housing with at least one substantially planar surface and a video screen positioned thereon. The device includes a digitizer positioned substantially coextensively under the video screen and a pen having a power source for activating the digitizer. Means for controlling the data acquisition device includes controllers comprising a first microprocessor, a second microprocessor connected to said digitizer and first processor for scanning the digitizer, a third microprocessor connected to said video screen for controlling screen images, a power manager connected to the first processor, the power manager including a power source and controller, program storage, and a program stored in the program storage for controlling the microprocessors.

14 Claims, 2 Drawing Sheets

SYSTEM FOR UTILIZING OBJECT ORIENTED APPROACH IN A PORTABLE PEN-BASED DATA ACQUISITION SYSTEM BY PASSING DIGITIZED DATA BY DATA TYPE TO HIERARCHICALLY ARRANGED PROGRAM OBJECTS

FIELD OF THE INVENTION

The present invention relates to a data acquisition system and, in particular, to a database information acquisition system which utilizes a pen-based interface as a data input and command initiator.

BACKGROUND OF THE INVENTION

Numerous portable electronic data acquisition means exist today. They include, for example, programmable digital computers, bar code scanners and readers, radio frequency communication tags and storage means, and digital and analog electrical input readers. Each of these devices addresses specific types of data input, such as electrical or electronic readouts from measuring or monitoring equipment, test equipment or keyboard input, optical scanners or radio frequency devices.

While many of these input devices are portable, they are limited to the specific type of data or data input mechanism used to acquire data. For example, bar code scanners can read data from a bar code and provide conversion for down loading into a computer or like means. General purpose computers, on the other hand, are limited to keyboard inputs which are ideal for inputting large amounts of data at a fixed location.

With the advent of lightweight portable computers, the ability to collect and analyze data at different locations has been greatly enhanced. However, the limitation of keyboard input reduces the effectiveness of such devices for certain data acquisition purposes. In particular, employment of portable, general purpose computers has not been successful for obtaining routine or repetitive types of field information at manufacturing processes, distribution locations, hospitals or the like or where the individuals required to use the computer are not skilled. To overcome some of these limitations, pen-based general computers have been introduced which permit input of data through a digitizer and "pen." The "pen" is used to activate the digitizer to produce handwritten, strike-based characters. These computers include character recognition algorithms which convert the handwritten input into computer recognizable data. These devices attempt to follow the paradigm of paper and pencil input which is particularly useful for those not skilled in keyboard input. However, to date, such devices have been of only limited success.

Generally, pen-based computers are designed to replicate the functions of general purpose programmable computers using a "pen" as the input means, rather than a keyboard. As such, these devices carry the overhead of a programmable digital computer, on-board memory storage and processing adapted to general purpose computing rather than data acquisition. Until only very recently, pen-based computers were not designed for efficient in-field data acquisition. See for example, the IBM's Thinkpad, Grid System's Grid Pad SL, NCR's, NCR 3130 Note Pad and Samsung's Penmaster. These computers are based on the Intel, 3865X or 386 SL microprocessor and weigh from 4.7 to 6.3 lbs.

A number of early devices have been designed to enhance in-field data acquisition by making them smaller and lighter to facilitate handling. However, these improved devices continue to function in the mode of a general purpose computer. They use the same microprocessors, general architecture and magnetic storage as general purpose microcomputers. Operating systems have been modified by reason of the change in input means and the need for character recognition, but basically, these improved pen-based computers are modified general purpose digital computers.

Accordingly, it is an object of the present invention to provide a portable data acquisition system which takes advantage of a pen-based input means, but without the disadvantages inherent in pen-based general purpose computers. It is a further object of the present invention to provide a data acquisition means having embedded process controllers and minimal on-board data storage. It is also an object of the invention to provide a data acquisition means which is portable, light weight and physically small to facilitate its use "in the field" using a powerful paper and pencil paradigm. It is also an object of the invention to provide a data acquisition means which is controlled by minimal code and on-board storage thereof and which is based on database rather than general data processing algorithms.

SUMMARY OF THE INVENTION

Generally, the present invention comprises a data acquisition system comprising a rugged housing or case of small external size and weight. In one preferred embodiment, the footprint of the case is about the size of an A-4 notebook with a thickness of $\geq 3$ cm. The case is designed for portable hand held use and comprises a pair of substantially flat planar surfaces defining the top and bottom, respectively, thereof. It is possible to "fold" the circuit board and provide a housing of significantly smaller size for holding in the palm of the user's hand if so desired.

On the top surface, a video display screen, preferably VGA compatible in a order to display information in the amount of a sheet of standard paper, is positioned. In the preferred embodiment, the screen is a bit-mapped LCD display of very thin design. Positioned substantially coextensively with and beneath the video display is a digitizer comprising an electronic grid matrix used to detect the position of an electronic digitizing "pen" thereon. The pen includes a self-contained power supply and a transmitter for sending a radio frequency signal to the digitizer when activated. In the present invention, depression of the pen is designed to have the look and feel of a writing pen so that when the point of the pen touches the screen the system is activated. In an alternative embodiment, the pen is connected or tethered to the digitizer pad through an electrical conductor. Such a tethered connection facilitates electrical "contact" between pen and pad; however, it also constrains the degree of freedom a cord-free pen displays. The video display screen displays bit-mapped image and graphics created by the digitizer pen as the pen "writes" on the screen.

A circuit board having integrated components is positioned within the housing to contain all of the electronic components of the data acquisition device system, including a first digital processing means, preferably a microprocessor, for controlling the system and executing the operating system and application codes. A graphic processor connected to the video screen is used for displaying data and graphical screen images. The graphics processor provides manipulation of images independent of the control processor to create an ink and paper paradigm. Also included on the board is a microcontroller connected to the digitizer for scanning the grid lines to determine pen location and a microcontroller for controlling the power flow to the various subsystems.

While various data storage means can be used in the present invention, such as random access memories, magnetic mass storage means such as hard disks, and the like, presently preferred storage means comprise removable memory cards. In the presently preferred embodiment of the invention, a number of slots are provided on the main circuit board for receiving such memory cards which offload data acquisition application programs and store the device's operating system. Thus, one slot is preferably dedicated for the operating system stored on a card. Approximately one megabyte of system software is contained on the system card which permits the system to execute codes and access storage.

For most applications of the present invention, there is no need for on-board memory, except that it is preferred to include graphic memory for graphics processing on-board. The data collection means of the present invention is functionally programmed as a direct access database using removable storage/application cards. It preferably includes non-disk based copy and execution operations and does not require a standard file system. Another advantage of the invention is its unique software approach providing an object oriented database. Other advantages of the present invention will become apparent from a perusal of the following detailed description of a presently preferred embodiment taken together with the accompanying drawings.

DESCRIPTION OF TEE PRESENTLY PREFERRED EMBODIMENT

Figure 1:
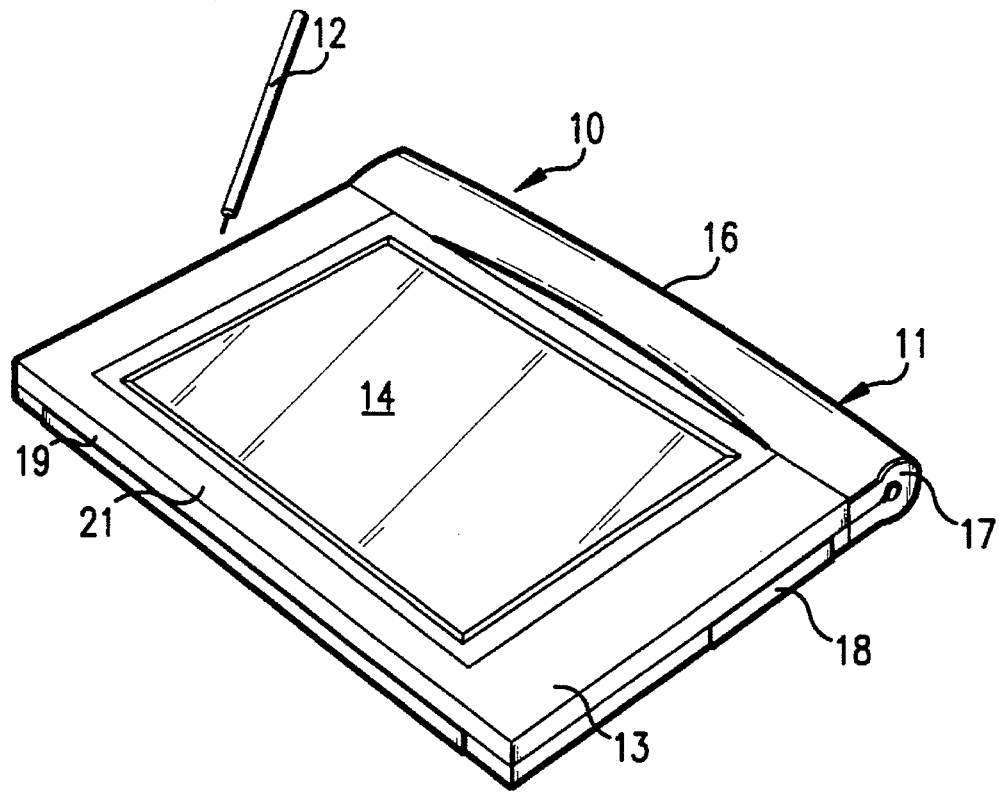
FIG. 1 is perspective view of the data acquisition device of the present invention.

Referring to FIG. 1, data acquisition device 10 includes a housing 11 and stylus or pen 12. Pen 12 includes a battery or power source and transmitter for sending a 57 KHZ signal upon activation to a digitizer described hereinafter. Case 11 includes a first planar surface 13 having positioned thereon video screen 14. Preferably, housing 11 is made from a polystyrene or polycarbonate and may include rubberized inserts (not shown) to afford enhanced protection for housing 11 for in-field usage.

Preferably, one longitudinal side member 16 of case 11 includes a slightly arcuate configuration for hand gripping to facilitate carrying and holding data acquisition device 10. Side member 16 is preferably designed to accommodate portable power sources such as batteries and includes an opening 17 at one for access to a battery cavity. Also, housing 11 includes opening means 18 for access to various output and input ports, such as an external expansion bus port, communication port and serial and parallel communication or printer ports as required.

A second opening means 19 is provided along the side 21 of housing 11. Opening means 19 provides access for memory card slots on the main circuit board (not shown). While magnetic memory means such as a hard disk or floppy disk can be used as the principal storage means, the present invention preferably uses PCMCIA memory cards (Personal Computer Memory Card International Association). The PCMCIA memory cards used in the present invention preferably meet the standards promulgated by that International Association. This is an industry-supported open standard that defines solid state, credit-card-size IC cards currently manufactured by a number of companies. The standards support functions for modems, fax, and networking in addition to memory and application storage. Thus, it is possible to add functionality to device 10 through the use of specialized memory cards.

In a presently preferred embodiment, one of the slots is dedicated to a system memory card 35 (described hereinafter) which contains the system operating software in one Mbyte of RAM and system stack and heap in one Mbyte of SRAM. In the preferred embodiment, the second Mbyte of RAM contains a "virtual" data card so that additional data cards are not necessary for proper system operation. Additional storage slots are preferably provided to hold ROM or SRAM cards of sizes ranging from 64 Kbytes to 8 Mbytes each. Memory cards typically have access times ranging from under 100 ns to slightly in excess of 250 ns even though the system runs at a clock speed of between 1 and 16 megahertz in a preferred mode. This affords access times generally faster than magnetic storage means. These cards are used to store user obtained data or applications for running various programs on the data acquisition device 10.

The memory card address used in the present invention is based on an 8 Mbyte block which is mapped when a card is activated by the system. The cards can either be active or inactive. An active card contains an active code used by the system. Cards are managed by low level kernel software contained on the system card.

Figure 3:
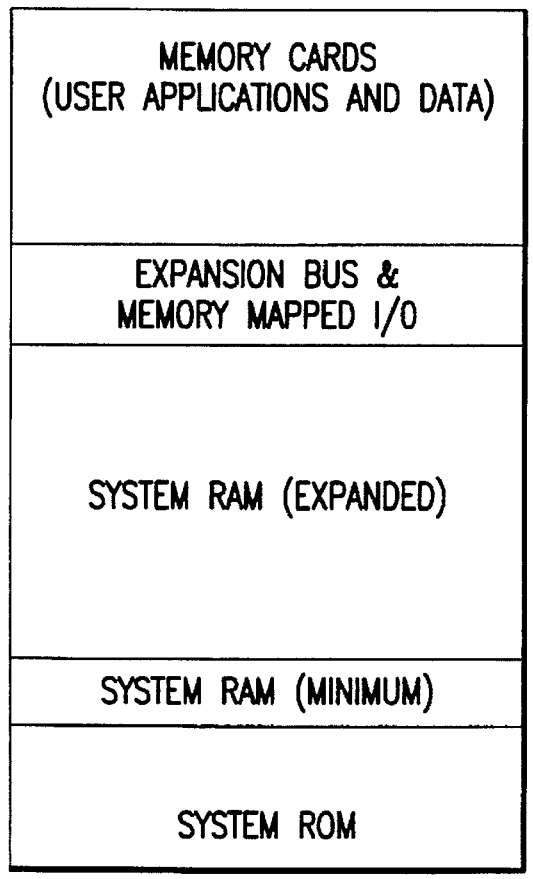
FIG. 3 is a diagrammatic view of a memory card mapping.

In addressing a card, eight bits are used to make a link between cards or data sets. Five of these data bits are defined as the logical ID of a card. Each of the cards has the ability to make links across cards in much the same way as in a hyperlinked and database schema. Thus, as the database is manipulated by an application, links are typically encountered which when traversed cause the system to map or swap another card into the data space. Likewise, as applications execute from a memory card, function calls may jump to and from codes residing on various cards, causing the system to map cards into the 8 Mbyte code space. Referring to FIG. 3, a schematic representation shows the memory map of such a card system used in the preferred embodiment.

Figure 2:
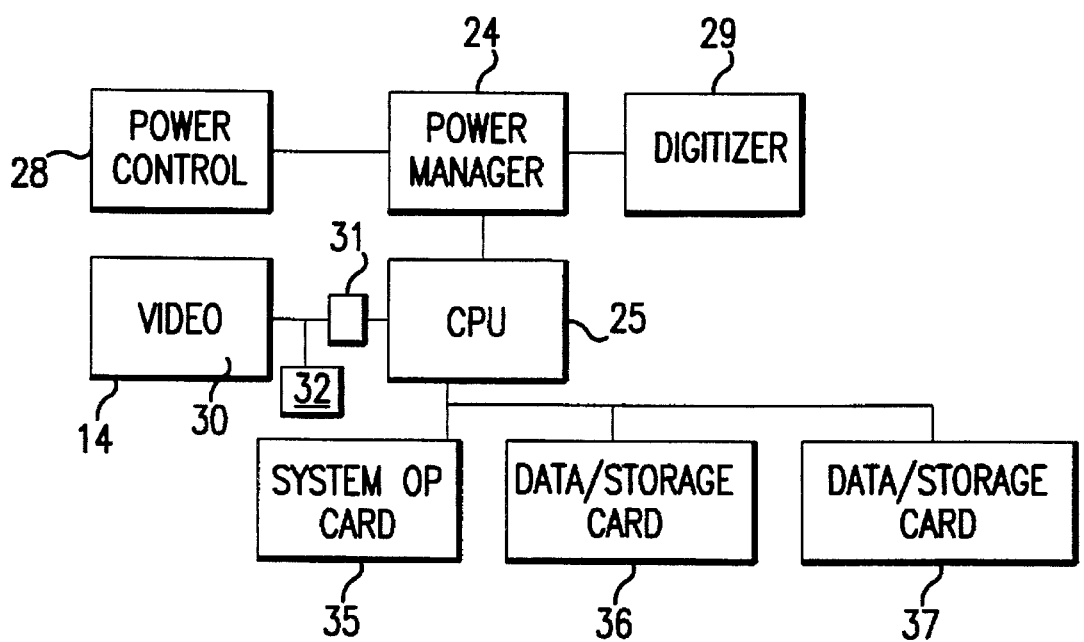
FIG. 2 is a schematic block diagram of the various components of the apparatus.

Referring to FIG. 2, a schematic diagram of the system architecture of acquisition device 10 is shown. FIG. 2 provides a representation of the general component configuration of the preferred embodiment described herein.

Thus, referring to FIG. 2, a central processing unit ("CPU") 25 is shown which is used to control device 10. In the presently preferred embodiment, a Motorola MC68331 microprocessor is used as an embedded controller. The clock speed of this particular controller can be dynamically adjusted from zero (low-power stop mode) to 16 megahertz depending on the system's activity. CPU 25 is based on the intermodule bus concept so that peripherals are integrated into the die with CPU MC68332 interfacing via an internal memory mapped bus. The 68331 CPU includes a system integration module with a ten chip select feature, a periodic interrupt timer, a software timer and the system clock controls. Additionally, a queued serial module is included which provides both a two wire asynchronous communication interface and a 16-word deep serial peripheral interface. Notwithstanding the practical advantages of this microcontroller, other processors may be used. For example, other processors based upon the 68000 Motorola chip can be effectively used as an embedded controller in data acquisition device 10.

CPU 25 is connected to power manager 27. Basically, power manager 27 takes care of turning the power on and off to various blocks on the system board on command. These circuits include the video circuit, speaker circuit, expansion buffer and graphics processor. However, it should be noted that the preferred embodiment is activated by proximity of pen 12 on screen 14 and no separate on or off switch is used in the power manager.

In the preferred embodiment of data acquisition device 10, an eight-bit Motorola MC68HC05 microcontroller is used to manage the system interrupts and process pen information before passing it onto CPU 25. It is also used to control system boot. Power manager 27 utilizes a time clock which all circuitry feeds into. The time clock determines the event and wakes up the microcontroller when put into one of the preferred sleep states. Presently, five different sleep states are used; awake, relaxed, napping, sleeping and off. It has also been found that napping and sleeping states can be eliminated and yet retain acceptable power conservation.

Connected to power manager 27 is power controller 28 which includes a power source, normally batteries, for example, 8 AA cells. Alternatively, the device can use rechargeable nickel cadmium or nickel metal hydride batteries. Power controller 28 provides power to the various circuits and turns those circuits on and off in connection with power manager 27. Power controller 28 also includes circuitry for controlling the brightness and contrast through electronic, not mechanical, control of screen 14. Using power manager 27 with five power states, it is possible to obtain up to eight hours of life from eight AA cells with normal usage of acquisition device 10.

Connected to power manager 27 is digitizer 29. Digitizer 29 includes a planar multi-layer inductive grid positioned under and substantially coextensive with screen 14. The preferred digitizer includes pen 12 which is used as the primary input means to acquisition device 10. Pen 12 is also used to reactivate the device in one of its lower power states. In the preferred embodiment, digitizer 29 includes a microcontroller 30 such as an Intel 87C51 chip. The microcontroller scans the grid lines of the digitizer to detect position, tilt, pressure and height off the screen surface of pen 12. The digitizer of the present invention preferably is one made by CalComp Corporation. The standard CalComp digitizer was modified by PI and CalComp to provide low power operation and support the embodied VGA screen. Other digitizers may be used, however, such as those of Gazelle Graphics Systems or Wacom.

Overlying the digitizer grid is video screen 14. In the preferred embodiment, screen 14 is a VGA compatible LCD screen manufactured by Sharp, Hitachi or Epson. As shown, a Sharp LM64P 522 LCD screen is used. Circuit of video screen 14 includes microcontroller 31 such as a Hitachi 63484 which is used to provide high level graphics commands such as lines, polylines, circles, fields and the like. Microcontroller 31 is also used to control graphic memory 32. In this embodiment, graphic memory 32 is connected in integral LCD controller HD64645. Graphic memory 32 provides through LCD controller a two-layer graphic buffer, to provide screen image and pen ink to emulate writing by pen 12. Preferably, screen 14 includes a removable overlay made of optical quality polycarbonate with hard coated roughed surface to provide surface feel for pen 12 analogous to pen and paper. Additionally, the overlay affords protection for screen 14 during infield use.

Figure 4:
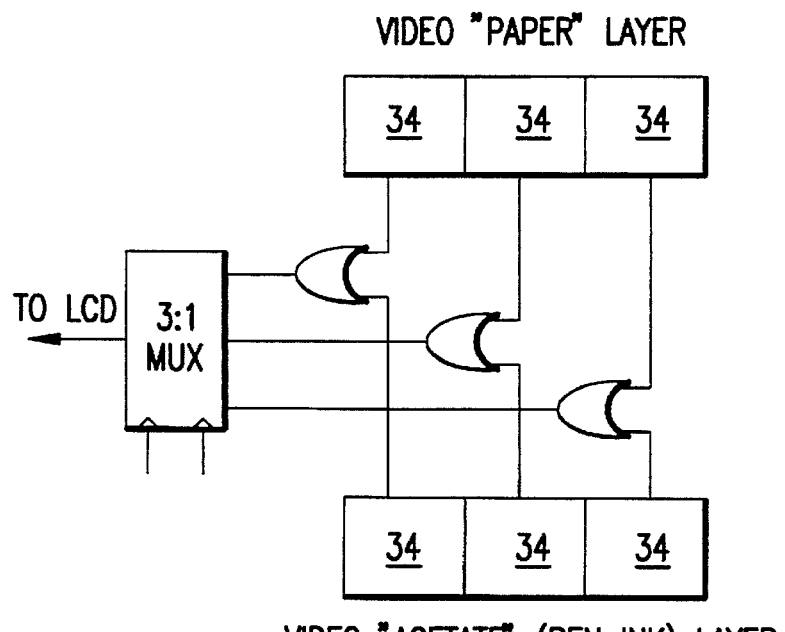
FIG. 4 is a diagrammatic view of the graphic memory used in the preferred embodiment.

As shown in FIG. 4, graphic memory is partitioned into six frame buffers 34 split into the two layers each having three buffers. The first layer is referred to as the paper and contains the screen image or graphics. The second layer referred to as the acetate, displays pen "ink". Each layer has only one active buffer at a time; typically the inactive buffers are used to cache fonts and icons that can be bit-blttd to the active paper layer for higher graphics performance. All images use one bit per pixel.

Alternatively, a single frame can be used. Preferably, a video memory utilizes any random access memory as the buffers.

Also, connected to CPU 25 are data storage cards 35, 36 and 37 respectfully. Card 35 preferably contains the system ROM/RAM used to operate acquisition device 10. Memory cards 36 and 37 are optional and include either/or both user application software or data storage. The software stored on the card is preferably object based written in C programming language. Card management utilizes a low level kernel and each of the memory cards includes, as described above, a five-bit identifier. A 64 bit identification cache is provided on the system to provide a global identification of each card. The system cache permits recognition of the previous 32 cards used and permits the ability to make links across the cards and request other cards not in the system if a desired link to that card is required to execute a program. Thus, a cache plus the identifier creates links between information on different cards. This eliminates the need to require global information to be physically placed on each of the cards.

It is also important to understand that as a data acquisition device, the present invention operates not only in the data input mode, but also interfaced with a host device which most probably operates on the data collected by device 10. Thus, many of the user applications will reside on host. In that relationship, the exchange of data is through the use of object mail boxes. The host mailboxes and the exchange of data is through the use of object mailboxes. The host mailboxes and the mailboxes in device 10 are searched for "objects". A translator or filter specifies when to execute by picking up the object and queuing it in link, storing it, or forwarding it to an operation such as printing or host. In this case, the host does all of the work. In the device 10, the mailboxes reside on the removable memory cards. Thus, no code (except system code) is moved. Only data objects are moved so that the objects define what happens.

The software used to control the operation of acquisition device 10 is preferably layered for a modular approach. In the instant case, the first level is the core or kernel software. This layer represents a very small portion of the system and isolates the rest of the system from being hardware implementation dependent and can be used to manage and control the hardware resources such as cards, real time clock, sound, screen polarity, contract, brightness, serial ports. Layered above the kernel are, for example, programs used to manage events, memory, graphics and the digitizer. The next level of software includes object-oriented interfaces for the database and user interface as well as the character recognition software. On top of that software resides a window manager and application framework program for executing user applications. Finally, on the top layer resides object oriented applications.

Object oriented applications permit acquisition device 10 to view all user applications objects so that interaction with all such applications is relatively standard. More importantly though, object oriented programming is preferred because it is possible to instantiate and embed other applications within an application without detailing the embedded application.

In the present invention, interaction between device 10 and user is based upon events. For example, the system is activated upon a pen down which is captured by the digitizer grid and logic and passed to CPU 25. Events in the device 10 include both physical and logical events. Physical events include pen tip down, pen tip up, side switch down, side switch up, card door open, low battery, failing battery, wake up, and time-out alarms. Logical events are generated by the system to trigger a response without actually targeting the responder. Examples of logical events include inserting characters, deleting characters, selecting a region, closing a window, moving a window, and refreshing windows.

Device 10 uses the hierarchical tree organization of the user-interface objects to determine the appropriate response to an event that occurs in a specific area of screen 14. The tree object has root branches and leaves. The immediate lower level relationships of various hierarchical levels are referred to hereinafter as "children". Thus, events that are not position specific are handled by whatever handler exists at the time the event occurs. If no handler is present, the event is discarded. The system event manager passes an event to a window manager, which in turn passes it to the root object via the user-interface framework, "UI". The event is then passed "down" the object tree until it reaches a "leaf" UI object (one that has no children or lower level). This UI object can then choose to handle the event or is directed back up the hierarchy. This mechanism gives the lowest-level object (the most specific object) the first opportunity to handle the event. If the event remains unhandled, it becomes a null event and is discarded. Provision is made to allow a parent object to intercept and block an event from propagating to the child object. This allows the application to block or perform special handling of events based on circumstances.

Because locality is the preferred basis for handling events and passing messages to UI objects, new objects can be installed without affecting any existing objects. This also allows applications to change the way a UI object handles an event. Moreover, the following example illustrates how an application can change event handling using a text input object. The text object's normal behavior when it passes an Insert event is to take the data (in this case a string) and append it to its internal storage. To make it a Read Only text object, all the application has to do is disable the handler for that message. When the object receives an Insert event, it will then ignore the event and pass it back up the hierarchy.

In device 10, objects are responsible for implementing their own behavior, while conforming to a minimal fixed external interface. The definition of an object includes not only its appearance and its data storage, but also how it interacts with events and with other objects.

For example, a number input object will only respond to an Insert event that contains numeric characters, namely, 0–9. Any other characters will be ignored. This object always exhibits the same behavior, regardless of where it is instantiated. Because behavior is an integral part of the object, any application that instantiates the object does not have to provide any code to filter the input data.

Objects with container ability have a specific interaction style with the objects they contain. For example, three container objects are preferably defined: Bag, Scaffold, and OneOf. All three can contain zero or more objects of any type, including other Bags, Scaffolds, or OneOfs. However, each organizes its children differently so that changes imposed on the container objects will be reflected differently by their children.

A Bag provides a visual organization of objects that is unconstrained of free form—its component objects can reside anywhere. When a Bag is resized, for example, the size and position of all its children with respect to the origin of the Bag's space are unchanged. The bag provides a viewport into its space and any child objects within the bag's space but outside the area of the viewport are simply invisible to the user.

A Scaffold provides a structured row/column organization for the objects it contains. Objects in a Scaffold are organized either in a row or in a column structure. When a Scaffold is resized, it will attempt to distribute the change in dimension to all its children that are set up to change. So, if there are four objects in a row Scaffold, and two of the four objects are set up to change, and if the row shrinks in the horizontal dimension by two inches, each of the two resizable children will be made to shrink in proportion to the new horizontal dimension.

On OneOf provides an overlapping organization of objects. All objects contained in a OneOf occupy overlapping visual space, and only one child object is visible at any one time. When OneOf is resized, all of its children are resized to the same new size.

Preferably, all objects support a common set of messages, and can send these common messages to any other objects. Common messages to similar to a base class definition. Common messages can be passed around the system without any explicit knowledge of the objects required. New objects can thus be defined, created, and installed without having to recompile the system.

The message handling mechanism is implemented using function tables. All object classes provide function tables which a predetermined number of seats in the table represent the common messages. The common messages which all UI objects support are set forth below:

| | |
|---|---|
| UI_DELETE_M | Deletes an object instance |
| UI_DRAW_M | Causes a redraw of the object instance |
| UI_MOVETO_M | Changes the location of the object |
| UI_RESIZE_M | Changes the dimension of the product processing |
| UI_PEN_M | Pen event message to the object for processing |
| UI_GESTURE_M | Passes a gesture event the object for processing |
| UI_GET_INFOI_M | Inquiries about attribute information of the object |

Every object instantiated in the system has a unique identifier that also contains its object type.

For example, to pass a message do_something_ to the object named object_x. the following will suffice: ui_do_ something (object_x .)

If object_x chooses not to handle the message do_something, the call will simply fail without serious consequence. This allows the caller not to worry about whether an object actually understands a particular message.

The relationship between a data object and a viewer/editor object is loosely constrained. This means that just because a data object contains an integral value, it is not constrained to be viewed only as a number. Different viewers can be attached to the same data object at the same time. For example, an integral data object can be viewed as a number using a simple text or number object or graphically, as a gauge, by using gauge object as the viewer.

In addition to being able to view the database information differently, viewers can also be constructed to view distinct portions—or hide certain pieces of a complex database object. For example, the database DATE/TIME object contains both the date and the time information. However, by design, the DATE user only displays the date while the TIME User interface object will only display and modify the "time" portion of the date.

Thus, programming device 10 is relatively straight forward and consists of connecting standard or user designed objects to database objects for viewing and editing. For example, an application may consist of one or more forms definitions which embody database records, user defined constraints between the fields in these records and a graphical representation of the records for viewing and editing. The application does not need codes for handling information flow within the system, rather only for dealing with the specific purpose of the application.

In the preferred embodiment, applications such as a text edition for notes, a sketch pad for drawings, a scribbler pad for capturing cursire handwriting and a handwriting recognition application with a trainer is stored in ROM as a built-in function device 10. The handwriting recognition application can be commercially available code.

While a presently preferred embodiment of the invention has been shown and described in particularity, it may be otherwise embodied within the scope of the appended claims.

What is claimed is:

1. An object oriented database data acquisition means comprising:
   a housing having a substantially planar video screen suitable for displaying images of at least electrical signals input through said video screen;
   a pen having power means for generating said electrical signals;
   a digitizer positioned substantially coextensively under said video screen for receiving said input signals from said pen to generate images substantially coextensive with the position of said pen on said video screen, and said digitizer converting said input signals into digitized data;
   a first microprocessor for controlling said data acquisition means;
   a second microprocessor connected to said digitizer and said first microprocessor for scanning said digitizer;
   a third microprocessor connected to said video screen for controlling said screen images;
   a power manager means connected to said first microprocessor, said power manager means including a power source and controller for supplying power to said data acquisition means;
   program storage mmeans for storing computer code for controlling said microprocessors;
   said program storage means comprising data storage means including a plurality of object mailboxes for storing said digitized data according to data type;
   at least one program from said object oriented database stored in said program storage means for controlling said first microprocessor for characterizing said digitized data according to data type such that said digitized data is passed to hierarchically arranged program objects and accepted or rejected by one of said objects dependent on said data type; and wherein said accepted digitized data is stored in at least one said object mailbox associated with said data type.

2. A data acquisition means as set forth in claim 1 wherein said program storage means comprise at least one removable memory card.

3. A data acquisition means as set forth in claim 1 wherein said video screen include a graphics memory.

4. A data acquisition mean as set forth in claim 1 wherein said power source for said power manager comprise batteries.

5. A pen activated object oriented computer comprising:
   a pen having a transmitter means and power source for generating input signals;
   a digitizer matrix activated by said transmitter means, and said digitizer converting said input signals into digitized data;
   a video screen overlaying said digitizer to generate images substantially coextensive with the position of said pen on said video screen and connected to at least one microprocessor controlled by at least one program from said object oriented database;
   at least one removable nonmagnetic storage means for storing code used for controlling said microprocessor;
   data storage means including a plurality of object mailboxes for storing said digitized data according to data type;
   said one program from said object oriented database stored in a program storage means for controlling said microprocessor for characterizing said digitized data according to data type such that said digitized data is passed to hierarchically arranged program objects and accepted or rejected by one of said objects dependent on said data type; and
   wherein said accepted digitized data is stored in at least one said object mailbox associated with said data type.

6. An object oriented database means comprising:
   a pen and digitizer interface means for interfacing through context independent viewers and editors, said pen generating input signals and said digitizer converting said input signals into digitized data;
   data storage means including a plurality of object mailboxes for storing said digitized data according to data type;
   wherein pen inputs to said interface means generate substantially coextensive images on a video screen controlled by at least one program from said object oriented database stored in a program storage means for controlling a microprocessor for characterizing said digitized data according to data type such that said digitized data is passed to hierarchically arranged program objects and accepted or rejected by one of said objects dependent on said data type; and
   wherein said accepted digitized data is stored in at least one said object mailbox associated with said data type.

7. An objected oriented database means as set forth in claim 6 wherein said means is portable and includes at least one removable storage means.

8. An object oriented database means as set forth in claim 7 wherein, said storage means comprise a PCMCIA memory card.

9. A database acquisition means as set forth in claim 1 wherein said program stored in said program storage means is layered object oriented software.

10. A database acquisition means of claim 1 wherein said stored program includes software for interpreting handwriting inputted to said digitizer for controlling said data acquisition means.

11. A database acquisition means as set forth in claim 1 including a graphic memory partitioned into at lease two frame buffers, said buffers being split into two layers each having at least one buffer, said one layer contain a screen image or graphics and said second layer displaying said pen movement.

12. A database acquisition means as set forth in claim 11 wherein said graphic memory is partitioned into six frame buffers, said buffers being split into two layers each having three buffers such that each layer has only one active buffer at a time and any inactive buffer is used to cache fonts and icons that can be bit-bittled to said first active layer for higher graphics performance.

13. An object oriented database data acquisition means of claim 1 further comprising:

a graphic memory means controlled by at least one program from said object oriented database and partitioned into at least two frame buffers;

said buffers split into two layers each having at least one buffer;

said one layer containing a screen image or graphics; and said second layer displaying a pen movement.

14. A graphic memory means as set forth in claim 13 wherein said graphic memory is partitioned into six frame buffers, said buffers being split into two layers each having three buffers such that each layer has only one active buffer at a time and any inactive buffer is used to cache fonts and icons that can be bit-bittled to said first active layer for higher graphics performance.

* * * * *